Nov. 6, 1962   TORU MIYASAKA   3,062,116
FILM WIND AND SHUTTER COCKING MECHANISM
Filed April 13, 1960   2 Sheets-Sheet 1

INVENTORS
TORU MIYASAKA
BY Stanley Wolder
ATTORNEY

Nov. 6, 1962 TORU MIYASAKA 3,062,116
FILM WIND AND SHUTTER COCKING MECHANISM
Filed April 13, 1960 2 Sheets-Sheet 2
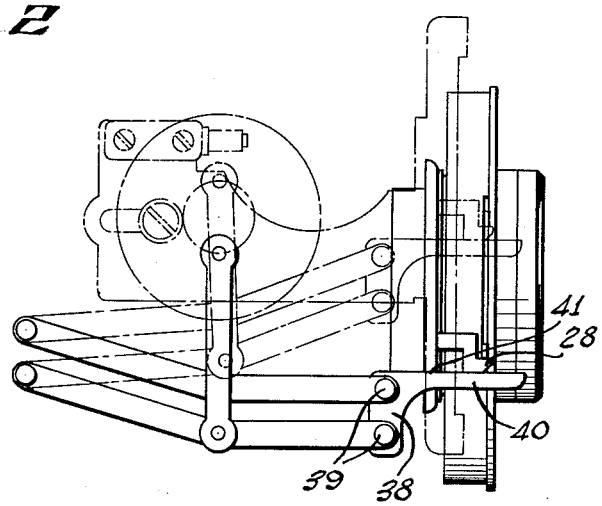
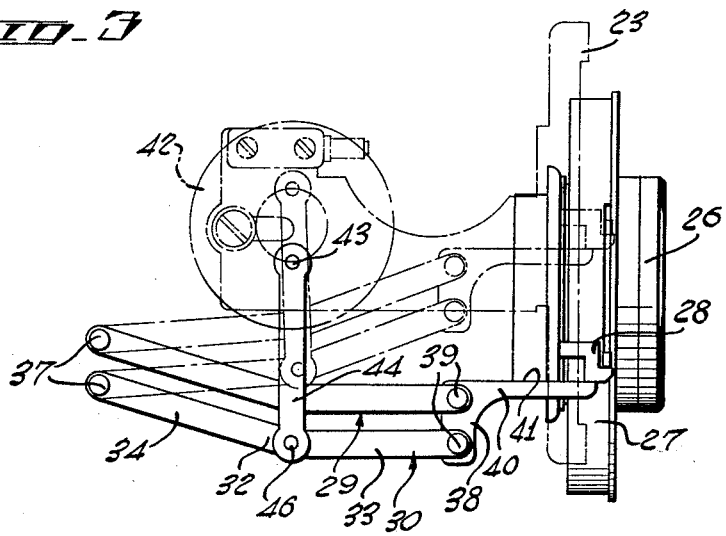
INVENTOR.
TORU MIYASAKA
BY *Stanley Wald*
ATTORNEY

3,062,116
FILM WIND AND SHUTTER COCKING MECHANISM

Toru Miyasaka, Okayashi, Naganoken, Japan, assignor to Yashica Co., Ltd., Tokyo, Japan, a corporation of Japan
Filed Apr. 13, 1960, Ser. No. 21,922
Claims priority, application Japan Apr. 18, 1959
6 Claims. (Cl. 95—31)

The present invention relates generally to improvements in photographic cameras and it relates more particularly to an improved camera shutter cocking mechanism.

In many types of cameras as typified by the automatic twin lens reflex camera the lens and shutter mechanism are movable relative to the body member of the camera to effect the focussing of the camera. The film advancing knob or crank is coupled to the shutter cocking mechanism so that the advancing of the film is accompanied by the concurrent cocking of the shutter. However, by reason of the varying position of the shutter mechanism relative to the film advancing knob the mechanical coupling between the two has heretofore possessed numerous disadvantages and drawbacks. The conventional mechanism connecting the actuating knob to the shutter cocking member is characterized by the excessive stress and mechanical shock accompanying the cocking operation which often lead to damage and malfunctioning of the shutter mechanism and the short life expectancy thereof. Complex mechanisms have been proposed and employed in order to overcome the above difficulties but these have failed to solve this problem.

It is therefore a principal object of the present invention to provide an improved photographic camera.

Another object of the present invention is to provide an improved camera shutter cocking mechanism.

Still another object of the present invention is to provide an improved camera shutter cocking mechanism wherein the relative position of the shutter mechanism and the actuating element is variable.

A further object of the present invention is to provide a mechanical coupling between an actuating knob and a relatively longitudinally movable shutter mechanism wherein the cocking operation is smooth, uniform, shockless and with a minimum of stress.

Still a further object of the present invention is to provide a camera shutter cocking mechanism of the above nature characterized by its simplicity, ruggedness, versatility and low cost.

The above and other objects of the present invention will become apparent from a reading of the following description taken in conjunction with the accompanying drawings wherein:

FIGURE 2 is a side elevational view of the improved shutter cocking mechanism, the shutter mechanism being illustrated in a retracted position and the cocking mechanism being illustrated by full line in retracted position and by broken line in advanced position; and FIGURE 3 is a view similar to FIGURE 2 with the shutter mechanism illustrated in advanced position.

Figure 1:
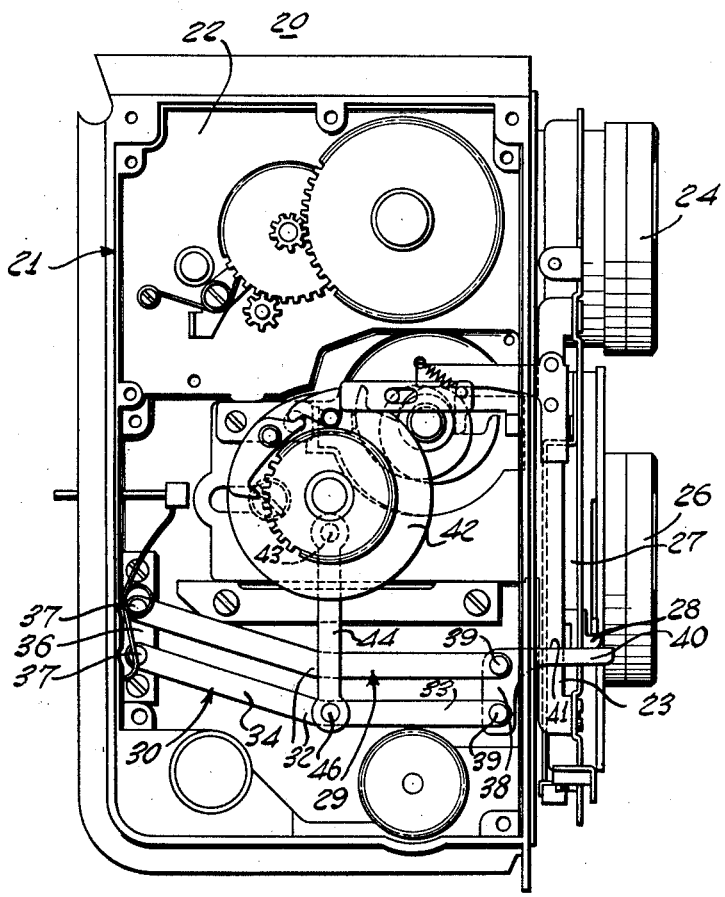
FIGURE 1 is a side elevational view of a twin lens reflex camera embodying the present invention, a side wall thereof being removed to expose the interior thereof.

In a sense, the present invention contemplates the provision of an improved camera comprising a body member, a shutter mechanism mounted on and longitudinally movable relative to said body member and including a cocking element vertically movable between an advanced and a retracted position, a parallelogram linkage pivotally mounted at its trailing corners to vertically spaced points on said body member and including a front link, means coupling said front link to said shutter cocking element, and manually operable means for rocking said parallelogram linkage. According to a preferred form of the present invention the parallelogram linkage includes a pair of parallel upper and lower longitudinally extending links pivoted at their trailing ends to a bracket mounted on the camera body member and having their leading ends pin connected to a front link. The front link is provided with a forwarding projecting arm which underlies and engages the cocking element. A crank pin is eccentrically mounted on a disc which is axially connected to the film winding knob. A link connects the crank pin to the lower parallelogram arm. Thus, rotation of the film winding knob rocks the parallelogram linkage to reciprocate the forwardly projecting arm along a fixed transverse linear stroke. As a result the movement of the cocking element by the cocking mechanism is independent of the longitudinal position of the cocking element.

Referring now to the drawings which illustrate a preferred embodiment of the present invention in which the aforesaid drawbacks and disadvantages of the conventional shutter cocking mechanisms are eliminated, the reference numeral 20 generally designates a twin lens reflex type of camera which incorporates the improved shutter cocking mechanism. In all other respects, the subject camera and its operating mechanism is conventional and will not be described in detail. The camera 20 includes a body member or casing 21 having a near side wall 22. The front of the camera 20 is defined by a panel 23 which carries an upper viewing lens 24 and a lower picture lens 26. The panel 23 is longitudinally movable between a retracted and advanced position in the usual manner by a knob or lever to effect the focussing of the camera. Associated with the picture lens 26 and movable therewith is a conventional shutter mechanism 27 provided with a cocking element 28 vertically movable between a lower retracted position and an upper advanced position to effect the cocking of the shutter.

The shutter cocking mechanism comprises a parallelogram linkage including a pair of longitudinally extending parallel, vertically spaced upper and lower angulated links 29 and 30 respectively, each of the links 29 and 30 being provided with an intermediate knee portion 32 from which extend a forward arm 33 and a rear arm 34. A bracket 36 is affixed to the rear section of the casing side wall 22 at about the level of the cocking element 28 when the latter is in its retracted position. The trailing free ends of the link arms 34 are pivotally connected to the bracket 36 by a pair of vertically spaced pins 37. Carried by and between the leading free ends of the link arms 33 is a vertical link 38 which is pivoted to the arms 33 by pins 39 whose vertical spacing is equal to that of the pins 37. Projecting longitudinally forwardly from the upper part of the link 38 is a leg 40 having a horizontal track defining upper edge 41 which underlies and slidably engages the under edge of the cocking element 28.

As in the conventional automatic twin reflex camera there is provided a film winding disc 42 which is located on the camera side wall and is rotated by the film advancing lever or knob disposed on the camera outer face. A crank pin 43 is eccentrically mounted on the disc 42 and is connected by a depending link 44 to a pin 46 located on the knee 32 of the lower parallelogram link 30. The eccentricity of the pin 43 and the dimensions and association of the various links are so related that the vertical movement of the leg 40 during a rotation of the film winding disc 42 is substantially equal to the shutter cocking stroke of the cocking element 28.

Considering now the operation of the improved shutter cocking mechanism described above, when the lens 26 and shutter mechanism 27 are retracted and the cocking element 28 is in its retracted position, as illustrated by full line in FIGURE 2, the cocking element 28 rests on the leg track 41. As the film winding disc 42 is rotated consequent to the advancing of the film, the link 44 is raised to swing the parallelogram linkage upwardly. The link 38 thereby moves upwardly parallel to itself to maintain the track 41 in a horizontal position and to advance the cocking element 28 the full stroke of its cocking movement. In their upper advanced position the cocking element 28 and cocking mechanism assume the position illustrated by broken line.

When the shutter mechanism is in its forward position as illustrated in FIGURE 3, of the drawings the procedure above described is repeated. It is important to note that the stroke of the cocking leg 40 remains constant as does that portion of the track 41 which engages the cocking element 28 and is independent of the longitudinal position of the cocking element. As a consequence, the cocking element, independent of the position of the shutter mechanism, is advanced a constant amount in the complete absence of any mechanical shock and excessive stress which is characteristic of the earlier shutter cocking mechanisms.

While there has been described and illustrated a preferred embodiment of the present invention it is apparent that numerous alterations, omissions and additions may be made without departing from the spirit thereof.

What is claimed is:

1. An improved camera of the character described comprising a body member, a shutter mechanism, mounted on and longitudinally movable relative to said body member and including a cocking element vertically movable between an advanced and a retracted position, a longitudinally extending parallelogram linkage pivotally mounted at its trailing corners to substantially fixed vertically spaced points on said body member and including a front link movable in a substantially common orientation, means coupling said front link to said shutter cocking element and manually operable means for rocking said parallelogram linkage.

2. An improved camera of the character described comprising a body member, a shutter mechanism mounted on and longitudinally movable relative to said body member and including a cocking element longitudinally movable therewith and vertically movable between an advanced and a retracted position, a pair of longitudinally extending vertically spaced substantially parallel arms pivoted at their trailing ends to said body member at substantially fixed vertically spaced first pivot points, a first link pivotally connected at the forward ends to said arms at vertically spaced second pivot points, said first link being provided with a longitudinally extending track slidably engaging said cocking element, and manually operable means connected to one of said arms to effect the rocking thereof.

3. A camera in accordance with claim 2 wherein said manually operable means includes a rotatable film winding disc, a pin eccentrically mounted on said disc and a second link pivotally connecting said pin and a pin mounted on an intermediate point of one of said arms.

4. A camera in accordance with claim 2 wherein said track is defined by the horizontal upper edge of a leg projecting forwardly from said first link.

5. A camera in accordance with claim 2 wherein the spacing between said first pivot points is substantially equal to the spacing between said second pivot points.

6. A camera in accordance with claim 2 wherein said arms are angulated and provided with knee sections intermediate the ends thereof.

References Cited in the file of this patent

UNITED STATES PATENTS 2,335,439  Nerwin et al. _____ Nov. 30, 1943

OTHER REFERENCES

German application DAS 1,027,981, printed April 10, 1958 (KI 572).